(12) United States Patent
Inoue (10) Patent No.: US 6,601,853 B2
(45) Date of Patent: Aug. 5, 2003

(54) BRUSH SEAL DEVICE (75) Inventor: Hideyuki Inoue, Sakado (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 10/170,361

(22) Filed: Jun. 14, 2002

(65) Prior Publication Data

US 2003/0001339 A1 Jan. 2, 2003

(30) Foreign Application Priority Data

Jun. 29, 2001 (JP) ........................................ 2001-199038

(51) Int. Cl.⁷ ............................................. F16J 15/447
(52) U.S. Cl. .................................... 277/355; 415/174.4
(58) Field of Search ......................... 277/355; 415/229, 415/230, 231, 174.2, 174.3, 174.4

(56) References Cited

U.S. PATENT DOCUMENTS

| | | | | |
|---|---|---|---|---|
| 4,600,202 A | * | 7/1986 | Schaeffler et al. | 277/355 |
| 5,031,922 A | * | 7/1991 | Heydrich | 277/355 |
| 5,042,823 A | * | 8/1991 | Mackay et al. | 277/355 |
| 5,066,025 A | * | 11/1991 | Hanrahan | 277/355 |
| 5,071,138 A | * | 12/1991 | Mackay et al. | 277/303 |
| 5,076,590 A | * | 12/1991 | Steinetz et al. | 239/127.1 |
| 5,108,116 A | * | 4/1992 | Johnson et al. | 277/355 |
| 5,176,389 A | * | 1/1993 | Noone et al. | 277/355 |
| 5,755,445 A | * | 5/1998 | Arora | 277/418 |
| 6,343,792 B1 | * | 2/2002 | Shinohara et al. | 277/345 |

FOREIGN PATENT DOCUMENTS

JP          403140673 A   *   6/1991

* cited by examiner

Primary Examiner—Anthony Knight
Assistant Examiner—Vishal Patel
(74) Attorney, Agent, or Firm—Arent Fox Kintner Plotkin & Kahn, PLLC

(57) ABSTRACT

When a clearance between a rotor and the free end of a brush seal of thin plates becomes larger by oscillation of the rotor or the like, the enlarged clearance is effectively sealed. In order to achieve this effect, in a brush seal device, brush seal units as recess layers and brush seal units as projection layers are stacked in the direction of the pressure of the sealed fluid to form recess and projection portion on its free end. The inner diameter of the recess layer is different from that of the projection layer.

5 Claims, 11 Drawing Sheets

Prior Art

Prior Art

BRUSH SEAL DEVICE

BACKGROUND OF THE INVENTION

1. Field of the Invention

The present invention relates to a brush seal device. More particularly, the present invention relates to a brush seal device having a brush seal mounted on one of two components displaceable relatively between the two components, wherein the brush seal is capable of resiliently deforming to follow the change of the clearance between the two components even if the relative change between the two components occurs.

2. Description of the Related Art

Figure 8:
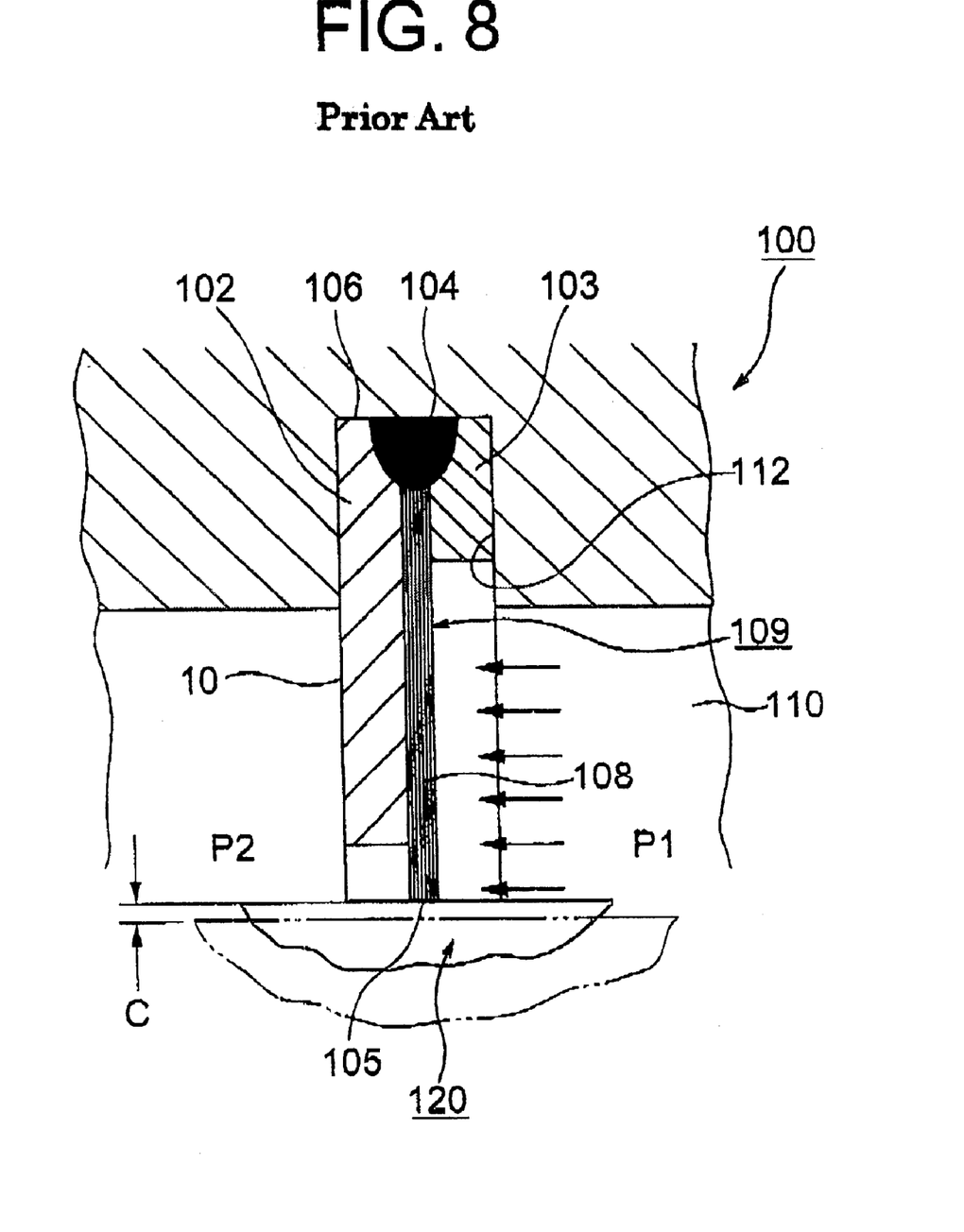
FIG. 8 is a sectional view, showing in half a brush seal device of a related art.

As one related to the present invention there exists a brush seal device 100, as shown in FIG. 8. FIG. 8 is a sectional view of a brush seal device 100 mounted between a rotary shaft 120 and a casing 110 through which the rotary shaft 120 passes. The casing 110 is a component disposed on the stationary side of a steam turbine or gas turbine. The brush seal device 100 is mounted to the casing 110 to seal fluid by separating the space between the casing 110 and the rotary shaft 120.

The brush seal device 100 is formed in a ring shape and attached to a channel section 112 in the casing 110. Main components of the brush seal device 100 are a brush seal 109, a backing plate 102 and a holding plate 103. In the brush seal 109, a number of bristles 101 are arranged around the circumference to form a partition wall, and on end of the bristles are coupled together to form an attachment section 104. A free end 105 as the other end of the brush seal 109 faces the rotary shaft 120. The diameter of the bristle 101 generally used is 0.02 to 0.5 mm. Tens of thousands or hundreds of thousands of bristles are used.

An annular backing plate 102 is located on one side face of the brush seal 109 with its side face 108 contacting the one side face of the brush seal 109 and supports the bristles 101 against pressure action of the sealed fluid.

A support plate 103 formed as a ring plate is disposed on the other side face of the brush seal 109 to sandwich, in cooperation with the backing plate 102, the brush seal 109 on its attachment section 104 side. The brush seal 109 is exposed at its free end 105 so that the side surface of the brush seal 109 is not wholly sandwiched.

One ends of the backing plate 102, the attachment section 104 of the brush seal 109, and the support plate 103 are welded together to form a connecting section 106.

Figure 9A:
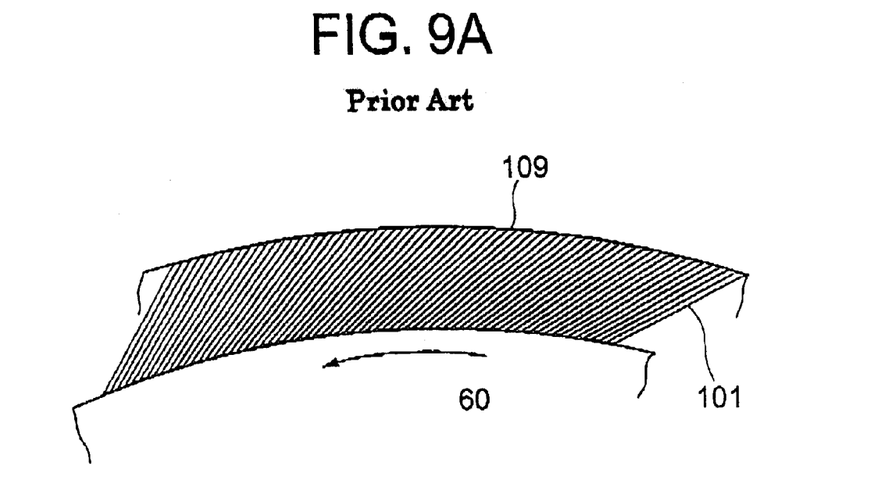
FIG. 9A is a plan view of a portion shown in FIG. 8.

FIG. 9A is a partial front view of the brush seal 109. The brush seal device 100 in FIG. 9A is in a state that the brush seal 109 and the rotary shaft 120 are normally fitted without oscillation, such that a number of bristles 101 extend straight and oriented to incline relative to the radial direction of the circumefrence of the rotary shaft 120. In the normal state of the brush seal 109, the rotary shaft 120 is in contact with or close to the free end 105, as shown by the solid line in FIG. 8.

Figure 10A:
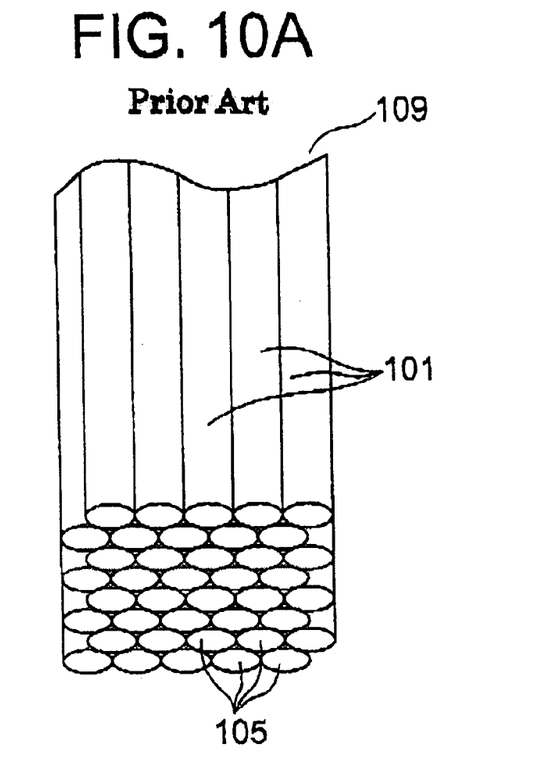
FIG. 10A is a perspective view of a brush part shown in FIG. 8.

FIG. 10A is a perspective view of the free end side of the brush seal 109. In FIG. 10A, the free end 105 is precisely processed by wire electronic discharging or the like such that the brush seal 109 fits the rotary shaft 120 after the process. The bristles 101 are however apt to be deformed, so it is extremely difficult to process them. Moreover, it is also difficult to precisely process the free end 105.

Figure 11:
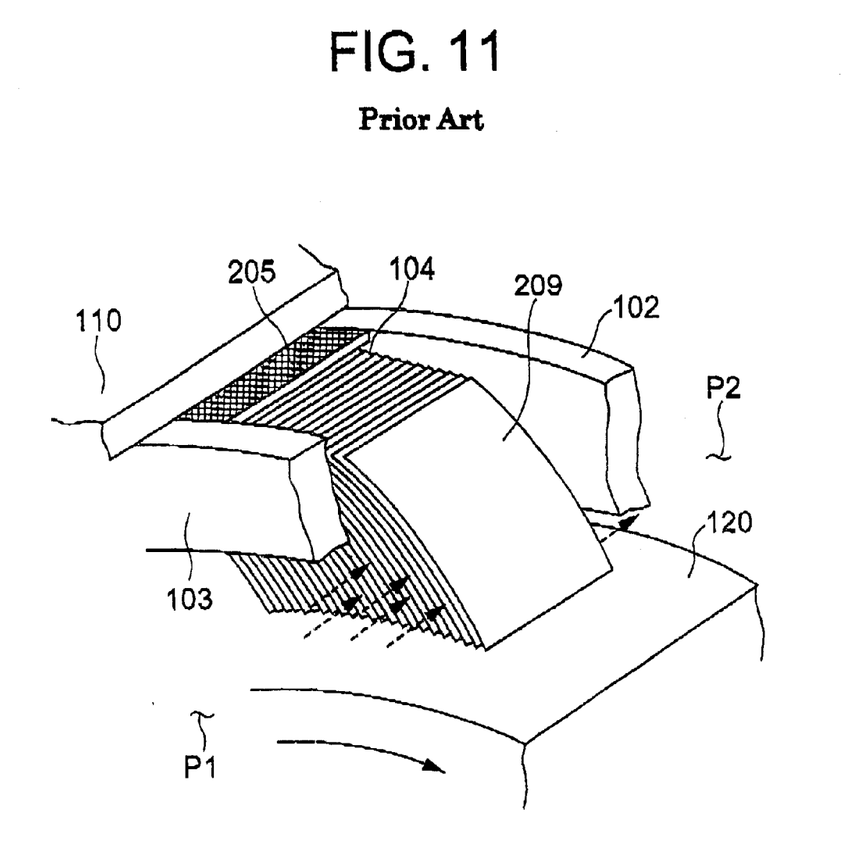
FIG. 11 is a perspective view of a brush part of another relative art.

A brush seal device 100B shown in FIG. 11 is another related art to the present invention. FIG. 11 shows thin plates as seals 209 that are piled in the direction of a circumference of a rotary shaft 120 and seal a high pressure area P1 and a low pressure area P2.

Outer circumference portion of the seal 209 is brazed and formed on an attachment section 104 as well as attached to the channel section of the casing 110 through the brazed attachment section 104. Also, a backing plate 102 is located at a side face of the seal 209 in a low pressure area P2, a holding plate 103 is located at a side face in a high pressure area P1, and both the plates 102 and 103 support both sides of the seal 209, respectively.

However, when the rotary shaft 120 eccentrically presses to contact the seal 209 formed in the above way, the piled seals 209 forming an annular body have no space for compensation and thus the spring constant corresponding to the resilient deformation is increased, and thus it is difficult to follow the eccentric behavior of the rotary shaft 120. Thus, clearance between the seals 209 and the outer circumference surface of the rotary shaft 120 is large, and it causes a problem relating to sealing ability for sealed fluid.

Additionally, the pressure of the sealed fluid acts on the seal 209 in the direction of the surfaces of the piled thin plates forming the seal 209 and, as the result, gaps are forcedly increased between the piled plates. Accordingly, also in this case, a problem concerning to the capability to prevent the leakage of fluid to be sealed is present.

Moreover, the brush seal 209 forming an annular body includes some hundreds of thousands thin plates used. Therefore, it is extremely difficult to fabricate the brush seal 209. Further, as the length along the outer circumference of the annular body of the brush seal 209 is longer than that along the inner circumference, spacers are necessarily disposed between thin plates on the outer circumference. However, gaps still remain between the surfaces of the piled plates. In this viewpoint, there also exists the problem of sealing ability. Also, in this constitution such that the flexibility thereof may be reduced, the free end 105 of the brush seal 209 be worn quickly.

Figure 9B:
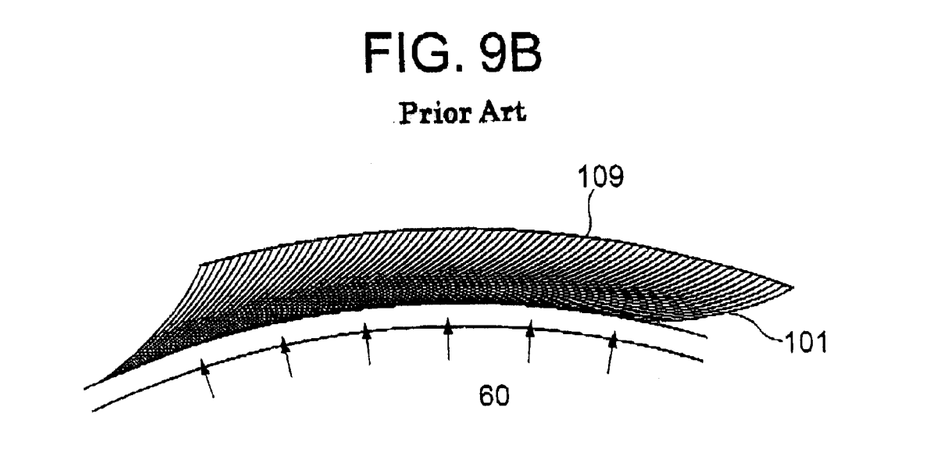
FIG. 9B is a plan view of a brush seal device shown in FIG. 8 in case that rotor is eccentric.

In the brush seal device 100A constituted as described above, when the rotary shaft 120 contacts the brush seal 109 involved in any oscillation, oscillation or the like, the brush seal 109 is pressed to contact the rotary shaft 120, and at he same time its tilt angle is increased, as shown in FIG. 9B. If the pressure of the sealed fluid is the higher P1 in this state, the differential pressure (P1–P2) between the P1 and the low pressure P2 is increased, and the whole straight bristles 101 of the brush seal 109 are pressed against the backing plate and become less deflective, and thus the ability to follow the rotary shaft 120 is worsened.

Figure 10B:
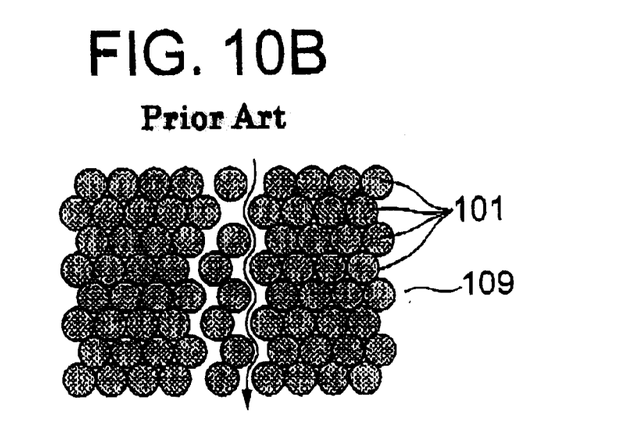
FIG. 10B is a plan view of a brush seal device shown in FIG. 10A, viewed from the inner diameter side in case that sealed fluid is affected to separate bristles.

FIG. 10B is a front view of the brush seal 109 in FIG. 10A, viewed from the free end 105 at inner side.

In FIG. 10A and FIG. 10B, if the sealed fluid flows into gaps between straight bristles 101, each bristle 101 arranged as shown in FIG. 10A, seen from the inner circumference side is pushed aside such that gaps between the bristles 101 are increased as shown in FIG. 10B, and then the sealed fluid leaks from those separated clearances. If this operation is combined with a condition that the bristles 101 in the inclined condition are separated by pressure, one separated side tends to displace such that the inclined angle is decreased, whereby the bristles 101 is deformed such that its length in the radial direction is large, and therefore it increases pressure to the rotary shaft 120 and causes wear. In addition to a condition like this, with respect to FIG. 8, compared to a position of the brush seal 109 pressed to the rotary shaft 120 (in the condition of FIG. 9B), in the opposite side to the radial direction from axis, a clearance C between a free side surface 105 and the rotary shaft 120 swings as shown in imaginary lines in the rotary shaft 120 of FIG. 8 and opens widely, causing leakage of the sealed fluid from the clearance C.

Also, with respect to a seal 209 in FIG. 11, because thin plates are attached in the direction to which the sealed fluid affects, attached surfaces of the thin plates are separated in the same way as in FIG. 10B if the sealed fluid affects, so that the sealed fluid leaks. In addition, because flexibility of the free end 105 of the seal 209 is inhibited, distance from the rotary shaft 120 should be large, and it causes a problem to the sealing ability and quickens wear.

The present invention has been made in consideration of the problems as mentioned above, and the technical task is to increase the sealing ability even if a clearance is formed between a casing and a rotor by a brush seal.

Also, it is another object to improve the resilient deformation of the brush seal in response to the pressure of the rotary shaft, so that abrasion of the brush seal by the rotary shaft is decreased.

In addition, it is yet another object to obtain good ability of the brush seal to follow in response to the relative displacement between the brush seal and the outer circumference of the rotary shaft to improve the sealing ability.

SUMMARY OF THE INVENTION

The present invention has been made to solve the problems as mentioned above, and a technical means for solving the problems is constituted as below. A brush seal of a preferred embodiment according to the present invention is a brush seal device, mounted on one of two components that are relatively rotated, for sealing the clearance given between the two components, comprising:

a brush seal having stacked brush seal units, each brush seal unit comprising: a brush section formed by forming slits in a thin plate at the side opposite to the other component; an attachment section as a base part that is fixed to the one component at the opposite side of the thin plate;

wherein the brush seal is a lamination of the brush seal units as recess layers that has at its free end recesses and the brush seal units as projection layers that has at its free end projections and are stacked in the direction of the pressure of sealed fluid; and wherein the inner diameter of the projection is different from that of the recess.

In the brush seal device of the preferred embodiment of the present invention, a plurality of brush seal units having a free end facing the surface of the mating component are formed such that each of the thin plates are formed into strips on one side thereof. One is formed with recess layer having larger inner diameter and the other formed with projection layer having smaller inner diameter. Those brush seal units having different diameters are laminated each other to form recess and projection portions on the free end, so that the free end can be flexibly deformed to fit closer to the opposing surface.

In addition, because the recess and projection portion controls the sealed fluid even if a rotor is moved by oscillation such that the free end and the opposing surface of the other component is separated apart, enlargement loss of fluid flowing between the recess and projection portion and loss of thermal dynamic as well as viscous drag are added, so that fluid body resistance is increased such that the amount of leakage of the sealed fluid can be made less.

Moreover, since a brush seal of relative arts is made up of hundreds of thousands of bristles, its inner circumference surface should be precisely processed by wire electric discharging or the like to form accurate circle, the free end of the present invention does not have to be precisely processed because the recess and projection portion increases fluid resistance to cause sealing effect even if a distance between the free end of the brush seal and the other part is increased. This enables an advantage of reduction of manufacturing cost.

In addition, when the rotor as the other component oscillates and presses the brush seal, a clearance C (refer to FIG. 8) is formed at a side symmetrical to the pressed point. However, the recess and projection portion formed in the free end of the brush seal increases fluid resistance, so that sealing effect is increased. Thus, an excellent sealing effect to the oscillating rotor is obtained.

Besides, because the attachment section side of the brush seals is integrated in one body such that base parts of the thin plates without strips formed are stacked, and this structure allows to form the attachment section by simply piling the brush seals, it is much easier to form the attachment section than to form attachment sections by welding hundreds of thousands of bristles.

The present disclosure relates to subject matter contained in Japanese Patent Application No.2001-199038, filed on Jun. 29, 2001, the disclosure of which is expressly incorporated herein by reference in entirety.

DESCRIPTION OF PREFERRED EMBODIMENTS

The embodiments of brush seal devices of the present invention will be described hereinafter with reference to the drawings in detail. The drawings herein are design drawings showing shapes according to precise dimensions.

Figure 1:
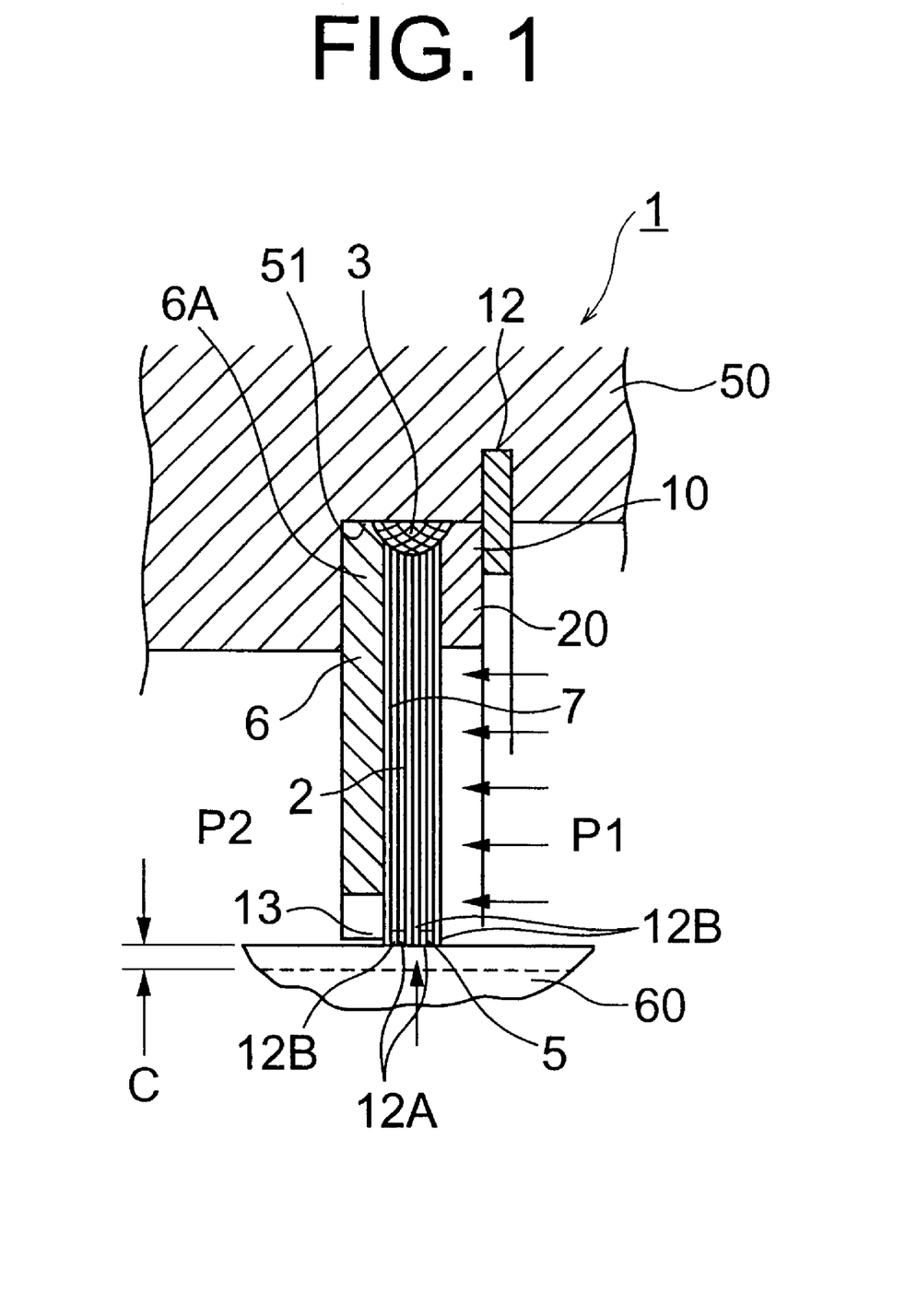
FIG. 1 is a sectional view, showing in half the first embodiment of a brush seal device according to the present invention.

FIG. 1 is a sectional view of a brush seal device 1 as a preferred embodiment, in which a clearance between a rotor 60 and a casing 50 of a gas turbine, is divided into a high pressure P1 side and a low pressure P2 side.

In FIG. 1, the reference numeral 1 denotes a brush seal device. A fixing section 20 at the outer circumference side of the brush seal device 1 is attached to a step 51 located in an inner circumference surface of the casing 50 as one of two components, through a snap ring 12. The fixing section 20 may be attached to a channel section 51 formed by a combination structure. A free end 5 at the inner circumference side of the brush seal device 1 contacts the opposite outer circumference surface of the rotor 60 as the other component, or is located closer to the surface. Thus, the brush seal device 1 seals fluid to be sealed at the high pressure P1 side.

The brush seal device 1 is mainly composed of a brush seal 2 only, and a backing plate 6 and a holding section 10 are accessories. Since the brush seal 2 is constituted by laminated thin plates, the brush seal 2 alone can seal without disposing the backing plate 6 or the holding plate 10.

Figure 2:
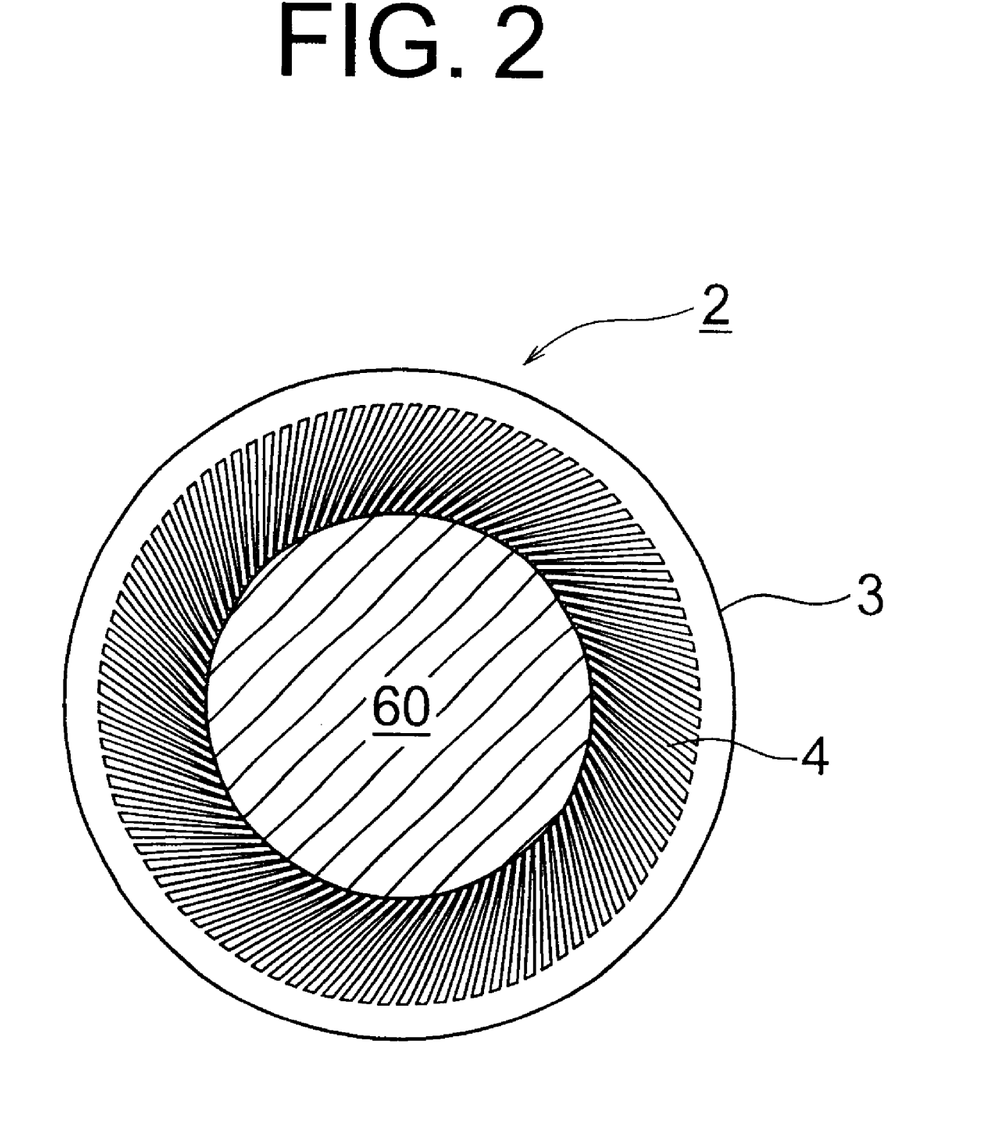
FIG. 2 is a front view of the brush seal and a shaft shown in FIG. 1, viewed from an axial direction.

The brush seal 2 is processed to have slits 9 slanting toward the rotational direction of the rotor 60 at the inner circumference side of the thin plates of an annular shape as shown in FIG. 2, such that it forms strips. By forming slits 9 in the brush seal 2, its inner circumference plate section constitutes a brush seal section 2a while a base part 2b of the outer circumference plate section constitutes an attachment section 3.

The brush section 2a is formed by forming the inner diameter side of an annular thin plate into small strips to constitute a brush section 8 with its cross section in the rectangular shape. A plurality of brush seal units 2P (also, referred to brush seal unit plate) are located in lamination state toward the axial direction of the rotor (rotary shaft) 60 to form a wall-like shape. Their outer circumference end portions are welded together to form an integrated attachment section 3.

The brush seal 2 is composed of integrated brush seal units 2P laminated in the direction of pressure action of the sealed fluid. The laminated brush seal units 2P have recess and projection portion 13 on the free end 5 formed by alternately laminating a recess layer 12A and a projection layer 12B having different inner diameters each other. The number of the recess layer 12A and the projection layer 12B may be one each, or may be a plural of the recess layers 12A and the projection layers 12B laminated alternately. The number is set, considering the sealing effect according to the width of the recess and projection portion.

The recess and projection portion 13 is formed in projection or recess with respect to a parallel line to the outer circumference surface of the rotor 60, but the recess and projection portion may be formed into a step shape in which diameters increase gradually as a layer is closer to the low pressure P2 side. Also, an embodiment of the recess and projection portion 13 may be a recess layer 12A forming brush seal units 2P having smaller inner diameter toward the low pressure and laminated such that the recess layer 12A has a step cross section, and also there is a brush seal of an embodiment in which the recess layer 12A is adopted to the recess and projection portion 13.

An embodiment of a brush seal 2 described above has slits 9 forming triangular spaces at the inner circumference side of a base part 2b of thin plates forming a ring shape, and a cross section of a brush part is angular (rectangular or square), and length of a side of the cross section is (0.005–0.5)×(0.005–0.5)mm, preferably (0.008–0.20)mm×(0.018–0.2)mm. Its length is within 5–50 mm. The thickness of the wall is determined as 0.01–0.4 mm or 0.4–5 mm; however, it may be determined depending on the pressure of the sealed fluid.

Materials of the brush seal 2 may be steel, stainless steel, nickel-base alloy, ceramic, or the like.

Figure 3:
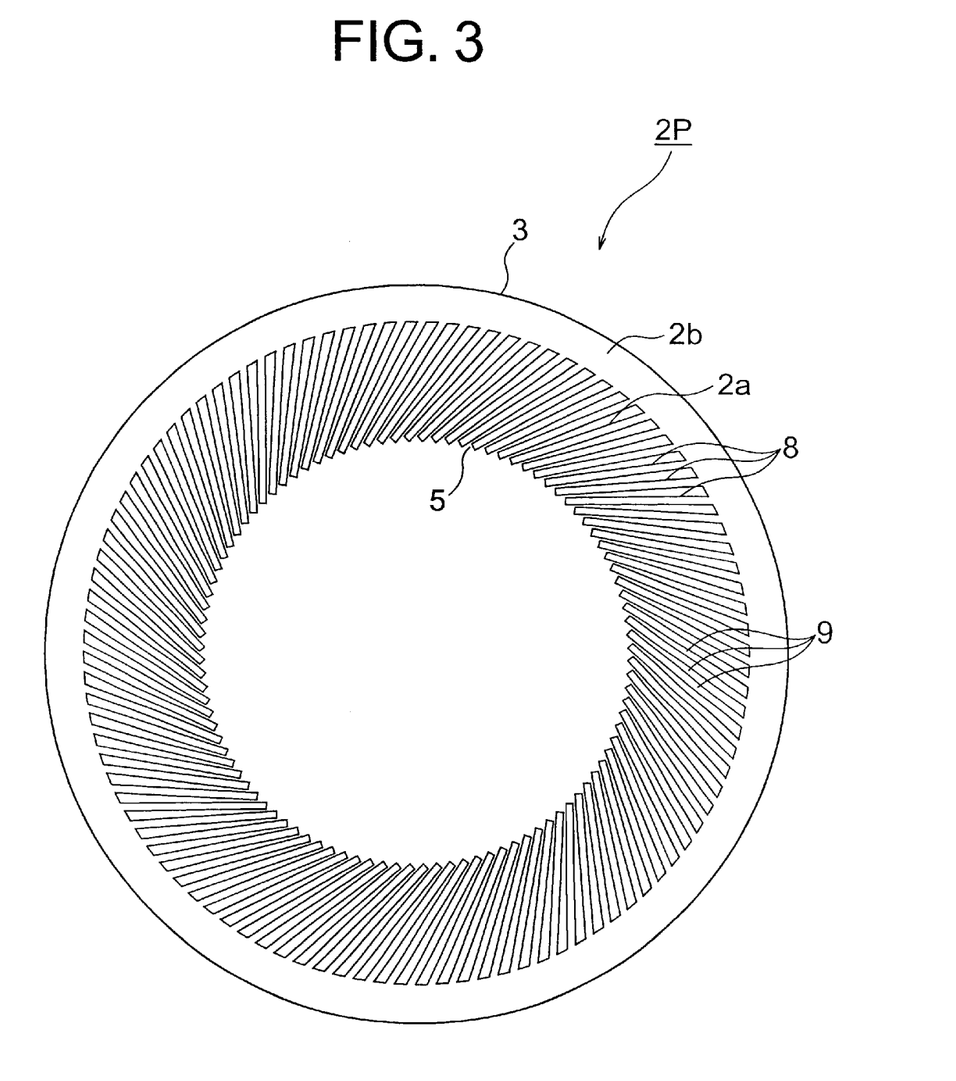
FIG. 3 is a front view of the second embodiment of a brush seal unit according to the present invention.

A brush seal unit 2P shown in FIG. 3 is a second embodiment according to the present invention. A plurality of the brush seal units 2P are laminated to form a brush seal 2 according to the amount of the pressure of the sealed fluid. The inner circumference side of the thin plates forming an annular shape is processed to form the slits 9 by etching, pressing, electric discharging or the like, such that the brush seal unit 2P has a brush section 2a in the strip like shape. Its outer circumference side is formed into a base part 2b of the thin plate without slits as a unit such that the brush section 2a will not be removed.

Each slit 9 is formed as a triangular space with narrow inner circumference side. The slit may be formed in a parallel space if necessary. The slit 9 forms a brush section 8 slanting toward the rotational direction of the rotor 60, and the tilt angle of the brush section 8 is determined, depending on the rotor (60) speed or the like. The brush section 8 may be formed in the rotating direction for both of the forward or reverse rotation.

A backing plate 6 comprises a fixing section 6A for supporting an attachment section 3 of the brush seal 2 and a supporting surface 7 for supporting such that the brush seal 2 will not be excessively bent by pressure of the sealed fluid. The supporting surface 7 and the brush seal 2 may be contacted as shown in FIG. 1. Alternatively, the supporting surface 7 and the brush seal 2 may be separated with a space.

A free end 5 of the brush seal 2 contacts the rotor 60 when the rotor 60 oscillates to a large extent, but, as the brush section 2a is composed of each brush part 8 which fine cross section is an angular shape, spring constant is small, and it follows resiliently to the oscillation of the rotor even if it contacts the rotor 60, so that abrasion is prevented. Thus, the brush seal 2 can be resiliently deformed in response to the oscillation of the rotor 60 even if it contacts the rotor 60. That is, contact can be absorbed depending on the spring constant set to the brush seal 2 when the rotor 60 oscillates. In addition, the brush section 8 of the brush seal 2 whose cross section is an angular shape further decreases the contacting pressure even if the rotor 60 oscillates and contacts more, so that abrasion is further prevented.

An attachment section 3 of the brush seal 2 is welded together with the backing plate 6 and a holding plate 10. The weld area of the three parts forms a fixing portion 20. The holding section 10 is formed into a ring shape with smaller width in diameter direction than that of the backing plate 6. In FIG. 1, the length of the holding section 10 is that of the fixing portion 20, but its length may be set close to that of the backing plate 6 in diameter direction. In this case of the long holding section 10, a space in which the sealed fluid can flow is formed between the brush seal 2 and a side face of the holding plate 10. The brush seal 2 alone may be attached to the casing 50 without provision of the backing plate 6 and the holding plate 10 to the brush seal device 1. The reason is that the brush seal 2 is composed of thin plates.

Material for the backing plate 6 and a holding section 10 is preferably selected according to the coefficient of linear thermal expansion of the casing 50. For example, it is produced using a nickel-base alloy, iron, steel, stainless, or other non-ferrous metal. Various kinds of material can be selected depending on the kind, temperature of the sealed fluid or other conditions in application fields.

Figure 4A:
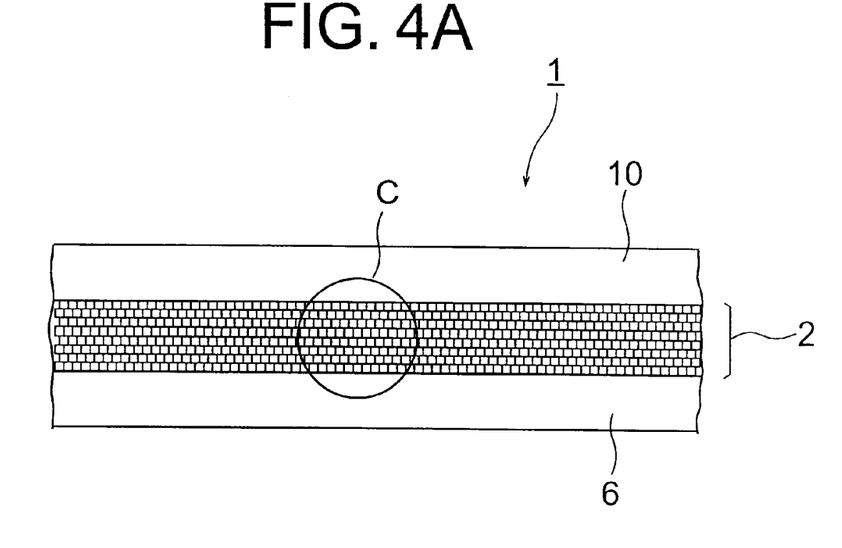
FIG. 4A is a partial plan view of a brush seal device according to the third embodiment of the present invention, viewed from the inner diameter side.
Figure 4B:
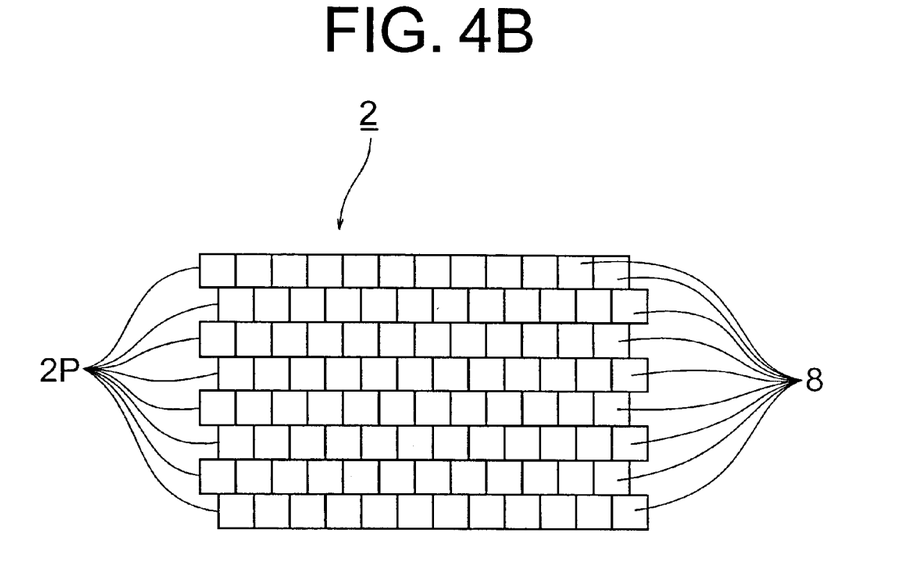
FIG. 4B is an enlarged view of the portion "C" shown in FIG. 4A.

FIG. 4A is a partial plan view of a brush seal device 1 shown in FIG. 1, viewed from the inner diameter side. FIG. 4B is an enlarged view of the portion C, shown in FIG. 4A. Each of FIGS. 4A and 4B shows the third embodiment of a brush seal device 1 according to the present invention.

In FIG. 4A, a brush seal 2 is comprised of brush seal units 2P laminated in eight layers. As shown in enlarged view of FIG. 4B, a cross section of a brush part 8 is formed in a square shape which are arranged such that slits 9 will not be in a row in the direction of pressure action of the sealed fluid. By arranging like this, leakage of the sealed fluid is prevented, thereby to improve the sealing ability.

Figure 5:
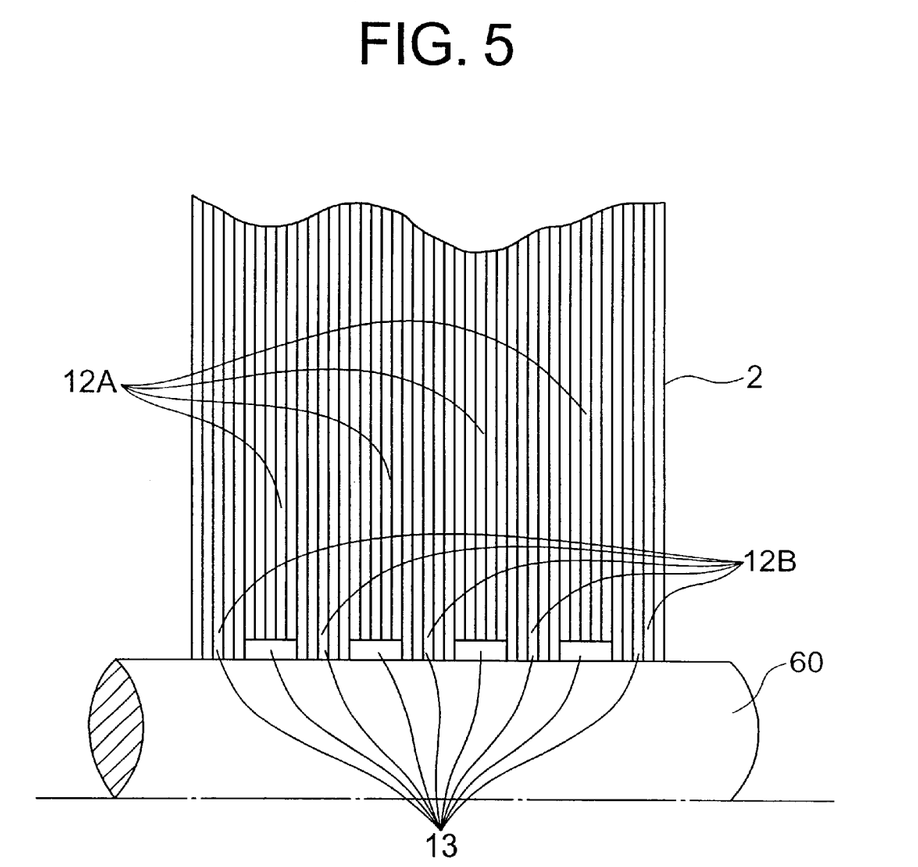
FIG. 5 is a sectional view of a recess and projection portion of a brush seal device according to the fourth embodiment of the present invention.

In FIG. 4B, each layer of brush seal 2 is comprised of two brush seal units 2P having the same inner diameter and alternately located to form a recess and projection portion 13 in the free end 5 as shown in FIG. 5.

FIG. 5 is a partial sectional view of a brush seal device 1. Also, FIG. 5 shows the fourth embodiment of the brush seal device 1 according to the present invention.

In FIG. 5, a brush seal 2 is comprised of five brush seal units 2P laminated to form a recess layer 12A and the same number of brush seal units 2P laminated to form a projection layer 12B, which are alternately laminated to form nine layers in total. Also, a recess and projection portion 13 is formed in the free end 5.

For the recess and projection portion 13, a various kinds of recess and projection portion 13 are formed, depending on the number of lamination layers of the recess layer 12A, the number of lamination layers of the projection layer 12B, and the number of layers of each layers of the recess layers 12A and the projection layers 12B. The width of the recess and projection portion 13 is determined, depending on the pressure of the sealed fluid or the like.

A cross section of the brush part 8 is usually formed in a square shape. When a rectangular shape is used, a side in the pressurized direction of the sealed fluid is longer than that shown in FIG. 4B, and the slits 9 are alternately located such that they are not in a row in the pressurized direction of the sealed fluid.

The arrangement of the brush parts 8 with this kind of cross sectional shape increases sealing ability and resilient deformation capacity of the brush parts 8.

Figure 6A:
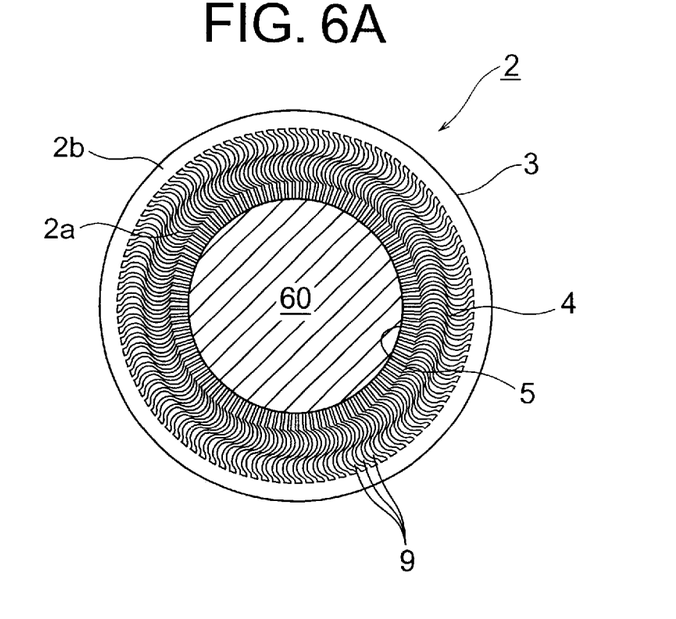
FIG. 6A is a plan view of a brush seal of a brush seal device according to the fifth embodiment to the present invention.

FIG. 6A shows a brush seal unit 2P with slits 9 at one side of thin plates. FIG. 6A shows the fifth embodiment of a brush seal unit 2P for a brush seal device 1 according to the present invention. The slit 9 of a brush part 2a of the brush seal unit 2P is formed in S-shape, and a portion closer to a free end 5 is formed as a straight beam 14. The spring constant of the brush seal unit 2P can be smaller than that of the brush seal unit 2P shown in FIG. 3.

In addition, the straight beam 14 allows a rotor 60 to rotate in forward or reverse direction. That is, rotation may not have to be one way, and it can be used when the rotor 60 rotates in forward or reverse direction.

A plurality of the brush seal units 2P shown in FIG. 6A are laminated to form a recess layer 12A, and a plurality of the brush seal units 2P shown in FIG. 3 are laminated to form a projection layer 12B, and then the recess layer 12A and the projection layer 12B are alternately laminated to form a recess and projection portion 13 on the free end 5 of the brush seal 2 as shown in FIG. 5.

Figure 6B:
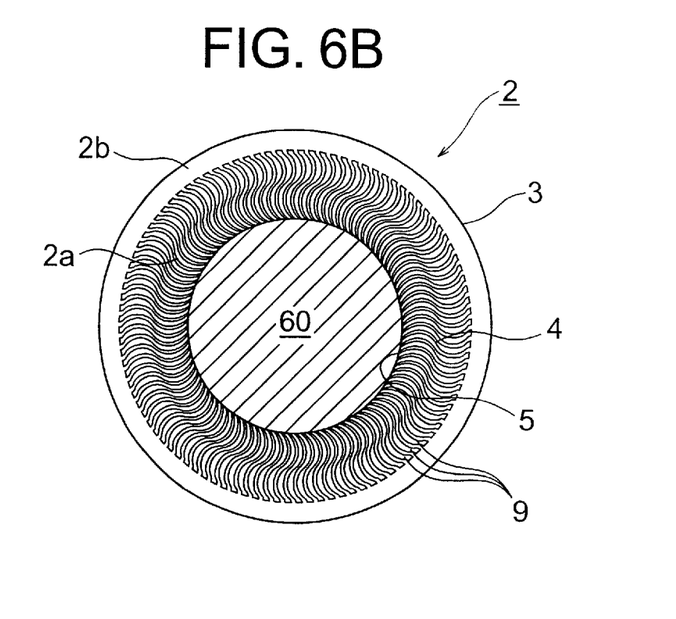
FIG. 6B is a sectional view of a brush seal of a brush seal device, showing the sixth embodiment according to the present invention.

With similar laminating conditions, a recess layer 12A may be constituted by the brush seal units 2P shown in FIG. 6A, and the projection layer 12B may be constituted by the brush seal units 2P shown in FIG. 6B to form a recess and projection portion 13 on the free end 5 of the brush seal 2. In this case, the ability to follow in a pressed condition when a rotor 60 oscillates or vibrates is increased so that abrasion of the brush seal 2 can be prevented. FIG. 6B shows the sixth embodiment of a brush seal device according to the present invention.

On the contrary, a recess layer 12A may be constituted by the brush seal unit 2P shown in FIG. 6B, and the projection layer 12B may be constituted by the brush seal units 2P shown in FIG. 6B to form a recess and projection portion 13 on the free end 5 of the brush seal 2. In this case, it can be used when the rotor rotates in forward or reverse direction.

In addition, a recess layer 12A may be constituted by a brush seal unit 2P composed of thin plates without a slit or by a brush seal unit 2P that slits are formed in the inner circumference side at every quarter, sixth or eighth of the circle, or the like.

Since this kind of recess layer 12A has few slits 9 or no slits 9, the recess layer 12A increases sealing ability even if a lot of large slits are formed in a projection layer 12B.

In this way, brush seal units 2P shown in FIG. 3, brush seal units 2P shown in FIG. 6A, or brush seal units 2P shown in FIG. 6B can be arbitrarily laminated to form a recess and projection portion 13 on a free end 5 of a brush seal 2, and a brush seal device 1 appropriate for operating condition of a rotor 60 can be constituted.

Figure 7:
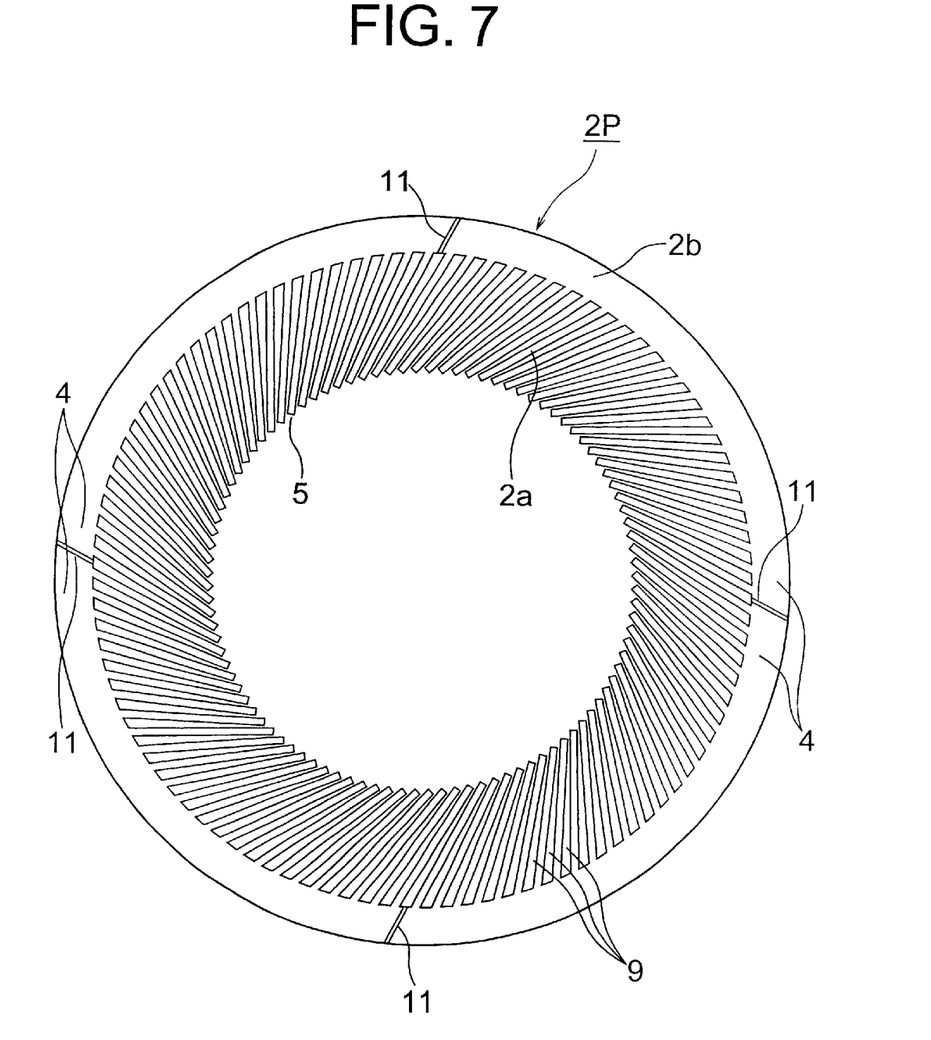
FIG. 7 is a plan view of a brush seal, showing the seventh embodiment according to the present invention.

FIG. 7 is a plan view of a brush seal device 1 showing the seventh embodiment according to the present invention. The brush seal unit 2P is composed of four brush seal division pieces 4 having arc shape whose division surfaces 11 are combined each other to form an annular shape as a whole. For the brush seal division pieces 4, slits 9 are formed in the inner circumference surface of an arc-shaped thin plate to form the brush seal division pieces 4.

By arranging the brush seal division pieces 4 such that their division surfaces 11 are not on one surface while laminating the brush seal division pieces 4, adjacent brush seal division pieces 4 fill spaces between the division surfaces 11, whereby leakage of sealed fluid from the division surfaces 11 can be prevented.

The constitution of the brush seal device 1 in which this kind of brush seal division pieces 4 are combined is very effective in view of both the cost and assembly when manufacturing the brush seal device 1 having large diameter. A recess layer 12A is constituted by a plural of brush seal units 2P which are the brush seal division pieces 4 combined to form annual shape, and a projection layer 12B is constituted by a plural of brush seal units 2P having different inner diameter, and the recess layer 12A and the projection layer 12B are alternately laminated to form a recess and projection portion 13 on the free end 5 of the brush seal 2 as shown in FIG. 5. By doing like this, any size of brush seal device 1 can be easily produced from the thin plate having a small area regardless of the diameter of a rotor 60.

Next, still another embodiment according to the present invention will be described. The preferred second embodiment of a brush seal device 1 according to the present invention comprises a backing plate 6 having a support surface 7 which is combined with an attachment section 3 of a brush seal 2 to support a side face of the brush seal 2; and a holding section 10 which supports the attachment section 3 of a brush seal 2 with the backing plate 6.

In the brush seal device 1 according to the second embodiment, even if a rotor 60 oscillates to form a clearance between a free end 5 and an opposing surface of at the other side, a recess and projection portion 13 of the brush seal 2 supported by a backing plate 6 controls the flow of sealed fluid such that enlargement loss and thermodynamic loss of the fluid flowing between the recess and projection portion 13 are added to viscous drag, and fluid resistance to the fluid flowing through the recess and projection portion 13 is increased, so that the advantage of decreasing leakage of the sealed fluid is obtained. Moreover, since the brush seal 2 is supported by the backing plate 6 and holding section 10 from both side and also supported by the backing plate 6 against pressure action of the sealed fluid, the shape of the recess and projection portion 13 in the free end 5 can be maintained to obtain labyrinth effect even if the pressure of the sealed fluid is high.

The brush seal device 1 according to the third embodiment of the present invention comprises a brush seal unit 2P forming a recess layer 12A which has slits 9 slanted in the moving direction of the other part and also comprises a brush seal unit 2P forming a projection layer 12B which has S-shaped slits 9 or S-shaped free end sides 5 formed as straight beams 14 in radial direction.

In the brush seal device 1 according to the third embodiment, the projection layer 12B is located in the proximate of the other part, for example, the rotor 60, and the slits 9 in the projection layer 12B are formed S-shaped, so that a brush section 8 is elastically deformed by the rotor 60 to reduce the pressed force when the rotor 60 oscillates and presses to a free end 5 of the brush seal 2. Thus, wear of the brush seal 2 caused by the friction against the rotor 60 can be prevented.

In addition, since the recess layer 12A is formed as the slits 9 are slanted, the spring constant of the S-shaped brush section 8 can be smaller than that of the slanted brush section 8 and elastically deformed in the direction of a diameter, and the slanted brush section 8 can be complexly supported. Thus, the brush section can receive the action force complexly with the recess layer 12A slanting in a direction, the complex resilient force allows the brush seal device 1 to follow the press of the rotor 60 by complex oscillation. This enables to effectively perform sealing effect against oscillation force of the rotor 60. In addition, combination of slits 9 whose directions are not the same closes the clearances between slits 9, so that sealing effect is performed.

The brush seal device 1 according to the fourth embodiment of the present invention is that the slits 9 of each brush seal unit 2P crossed in the laminated direction.

In the brush seal device 1 according to the fourth embodiment, slits 9 of the brush seal units 2P crosses in the piling direction, so that brush parts 8 adjacent to each other closes the clearances between each slit 9, whereby sealed fluid can be effectively sealed by the brush seal 2 deforming like a plate.

The brush seal device 1 according to the fifth embodiment of the present invention comprises a brush seal unit 2P forming a projection layer 12B which has slits 9 slanted in the moving direction of the other part and that the a brush seal unit 2P forming a recess layer 12A is formed as a thin plate without a slit 9 or as a thin plate which the width of the brush section 8 of the recess layer 12A is larger than that of the brush section 8 of the projection layer 12B.

In the brush seal device 1 according to the fifth embodiment, since the slits 9 of the projection layer 12B are slanted in the rotational direction of a rotor 60, for example, they can elastically follow in the rotational direction of a rotor 60. Thus, wear caused by friction is prevented.

In addition, because the brush seal unit 2P forming the projection layer 12B is formed as a brush seal 2 that the clearance between slits 9 are large, that is, width of the brush section 8 is large, clearances between the part at one side and the other part at the other side are securely sealed with the sealed fluid by the recess layer 12A. Thus, in addition to the elastic following-up characteristic by the projection layer 12B, excellent effect of sealing the sealed fluid by the recess layer 12A is performed.

Since a brush seal device according to a preferred embodiment of the present invention comprises brush seal units 2P laminated alternately to form a recess and projection portion in a free end, in addition to viscous drag, enlargement loss and thermo dynamic loss of flow are added to the fluid flowing through the recess and projection surface which increases fluid resistance. Thus, sealing effect is enabled even in the presence of clearance between a free end of the brush seal and an outer circumference surface of a rotor.

Since the both sides of a free end of the projection layer of a brush seal are formed as recess layers, elastic deformation is enabled, and a free end can be fit closer to an opposite surface of the other side. In addition, since the both sides of a free end of the projection layer of a brush seal are formed to recess surface, flexibility is added whereby the free end can be located closer to a rotor, and the advantage of increasing sealing effect between the free end and the rotor can be obtained.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A brush seal device, mounted on a first component of two components that are relatively rotated, for sealing the clearance given between the first component and a second component, comprising:
    a brush seal having stacked brush seal units, each brush seal unit comprising:
        a brush section formed by forming slits in a thin plate at a first side facing the second component;
        an attachment section as a base part that is fixed to the first component at a second side of the thin plate;
    wherein the brush seal is a lamination of the brush seal units as recess layers that has at its free end recesses and the brush seal units as projection layers that has at its free end projections and are stacked in the direction of the pressure of sealed fluid;
    wherein the inner diameter of the projection is different from that of the recess and wherein at least one recess layer is positioned between two brush seal units as projection layers.

2. The brush seal device according to claim 1, further comprising:
    a backing plate attached to the attachment section of the brush seal and having a support surface for supporting a side face of the brush seal; and
    a holding section for supporting the attachment section of the brush seal between the backing plate and the holding section.

3. The brush seal device according to claim 1, wherein the slits formed in the brush seal unit forming the recess layer of the brush seal are slanted toward the rotational direction of the second component and the slits of the brush seal forming the projection layer are formed in a sigmoidal shape or the slits in the shape of sigmoidal on the free end side are formed in a straight beam in the radial direction.

4. The brush seal device according to claim 1, wherein the slits of the brush seal units intersect each other in the direction of the stack of the brush seal units.

5. The brush seal device according to claim 1, wherein the brush seal unit forming the projection layer has slits slanted in the moving direction of the second component.

* * * * *